United States Patent
Kavuri et al.

(10) Patent No.: US 11,140,526 B2
(45) Date of Patent: *Oct. 5, 2021

(54) ACCESSORY DEVICE TEXTING ENHANCEMENTS

(71) Applicant: Apple Inc., Cupertino, CA (US)

(72) Inventors: Lakshmi N. Kavuri, Cupertino, CA (US); Utkarsh Kumar, Fremont, CA (US); Shashikant Tiwari, Sunnyvale, CA (US); Abhilash Bhagyanagar, Fremont, CA (US); Ashwini Pradeep, San Jose, CA (US); Mirza Mohd Ahsen Baig, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,166

(22) Filed: Jun. 2, 2020

(65) Prior Publication Data

US 2020/0382917 A1 Dec. 3, 2020

Related U.S. Application Data

(63) Continuation of application No. 16/594,159, filed on Oct. 7, 2019, now Pat. No. 10,687,182.

(60) Provisional application No. 62/855,831, filed on May 31, 2019.

(51) Int. Cl.
*H04W 4/00* (2018.01)
*H04M 1/00* (2006.01)
*H04W 4/14* (2009.01)
*H04W 8/18* (2009.01)
*H04W 76/14* (2018.01)

(52) U.S. Cl.
CPC ............... *H04W 4/14* (2013.01); *H04W 8/18* (2013.01); *H04W 76/14* (2018.02)

(58) Field of Classification Search
CPC .......... H04W 4/14; H04W 76/14; H04W 8/18
See application file for complete search history.

(56) References Cited

U.S. PATENT DOCUMENTS

| 10,687,182 | B1 * | 6/2020 | Kavuri | ................ H04W 76/14 |
| 2017/0185052 | A1 | 6/2017 | Wang | |
| 2018/0115418 | A1 | 4/2018 | Lakin | |

* cited by examiner

*Primary Examiner* — Erika A Washington
(74) *Attorney, Agent, or Firm* — Kowert, Hood, Munyon, Rankin & Goetzel, P.C.

(57) ABSTRACT

Methods and devices for a wireless accessory device (AD) comprising a cellular radio to communicate with a cellular network using the cellular radio. The wireless AD establishes a texting session with a network entity through the cellular network and using the cellular radio. The wireless AD initiates a countdown timer in response to establishing the texting session. The wireless AD determines that a companion device to the wireless AD is reachable by the wireless AD. The wireless AD refrains from pairing with the companion device until the countdown timer expires in response to determining that the companion device is reachable by the wireless device. After expiration of the countdown timer, if the companion device is still reachable by the wireless AD, the wireless AD may pair with the companion device and/or power down its cellular radio.

20 Claims, 4 Drawing Sheets

ACCESSORY DEVICE TEXTING ENHANCEMENTS

PRIORITY CLAIM

This application is a continuation of U.S. patent application Ser. No. 16/594,159, now U.S. Pat. No. 10,687,182, filed Oct. 7, 2019, titled "Accessory Device Texting Enhancements", which claims priority to U.S. Provisional Patent Application No. 62/855,831, titled "Accessory Device Texting Enhancements" and filed on May 31, 2019, which are both hereby incorporated by reference in their entirety, as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication, including providing improved text communication capabilities for a small form factor device, such as a smart phone or wearable device (e.g., a smart watch).

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets, which users often carry on their person or hold. Smaller form factor devices, such as smart watches, are a newer form of mobile electronic device. These and other devices which are designed to be worn by the user may be referred to as wearable devices. In the past, the wireless communications capabilities of wearable devices have been generally limited; for example, some wearable devices have been capable of communicating only through wired interfaces or over short-range point-to-point technologies. Moreover, wearable devices typically have smaller batteries and more limited input and output capabilities than larger portable devices such as smart phones and tablets. These hardware limitations present unique challenges to deliver a good user experience in text messaging applications utilizing small form factor devices. Thus, improvements in the field are desirable.

SUMMARY

Embodiments are presented herein of, inter alia, a user equipment (UE) device, which may be a smart phone or a wearable device, such as a smart watch, and associated methods for enabling the device to improve continuity of text messaging applications for essential services such as emergency scenarios and other important applications.

In some embodiments, a wireless accessory device (AD) such as a wearable device establishes a texting session with a network entity through a cellular network and using a cellular radio of the wireless AD. The wireless AD then initiates a countdown timer in response to establishing the texting session.

In some embodiments, the wireless AD determines that a companion device to the wireless AD is reachable by the wireless AD. In some embodiments, the wireless AD refrains from pairing with the companion device until the countdown timer expires at least in part in response to determining that the companion device is reachable by the wireless device.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
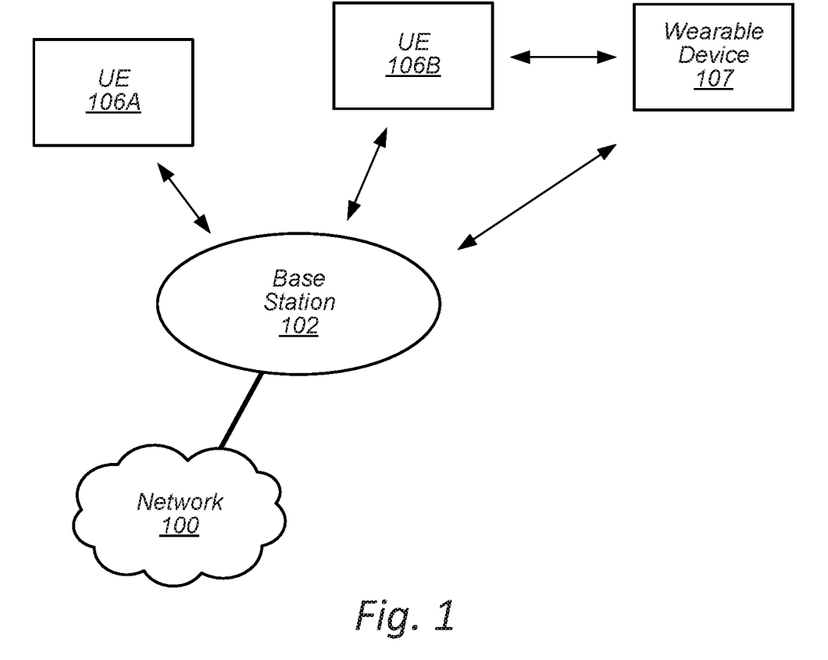
FIG. 1 illustrates an example wireless communication system including a wearable device, according to some embodiments.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as a small form factor device, which as an example may be a wearable device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA). The base station 102 (or similar network infrastructure) may also support other communication technologies, such as text messaging, e.g., SMS (Short Message Service) and similar text messaging technologies, such as iMessage™, Facebook Messenger™, WhatsApp™, etc.

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), 5G New Radio (NR), HSPA, 3GPP2 CDMA2000 (e.g., 1×RTT, 1×EV-DO, HRPD, eHRPD), Wi-Fi, WiMAX etc. One example of LTE or LTE-A communications may be VoLTE (Voice over LTE).

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, 5G NR, WLAN (Wi-Fi), Bluetooth, WiMAX, one or more global navigational satellite systems (GNSS, e.g., GPS or GLONASS), one and/or more mobile television broadcasting standards (e.g., ATSC-M/H), SMS, etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with communication capability, such as cellular communications capability. The UE 106B may be configured to communicate with the UE device 107, which may be referred to as a small form factor device, a wearable device, or a wireless accessory device (AD) 107. The wireless AD 107 may be any of various types of devices. Typically a wireless AD has a smaller form factor, and may have limited battery, output power and/or communications abilities relative to UEs 106. As one common example, the UE 106B may be a smart phone carried by a user, and the wireless AD 107 may be a smart watch worn by that same user, or possibly a different user. Thus, as another example, in the operation described herein the UE 106B may be a smart phone carried by a first user, and the wireless AD 107 may be a smart watch worn by a second, different user. The UE 106B and the wireless AD 107 may communicate using any of various short-range communication protocols, such as Bluetooth, Wi-Fi, etc.

The wireless AD 107 may include communications capability, e.g., cellular communication capability, and hence may be able to directly communicate with cellular base station 102. However, since the wireless AD 107 is possibly limited in one or more of its communication capabilities, output power, and/or battery, wireless AD 107 may in some instances selectively utilize the UE 106B as a proxy for communication purposes with the base station 102 and hence to the network 100. In other words, the wireless AD 107 may selectively use the cellular communication capabilities of the UE 106B to conduct its cellular communications. The limitation on communication abilities of the wireless AD 107 can be permanent, e.g., due to limitations in output power or the radio access technologies (RATs) supported, or temporary, e.g., due to conditions such as current battery status, inability to access a network, or poor reception.

Figure 2:
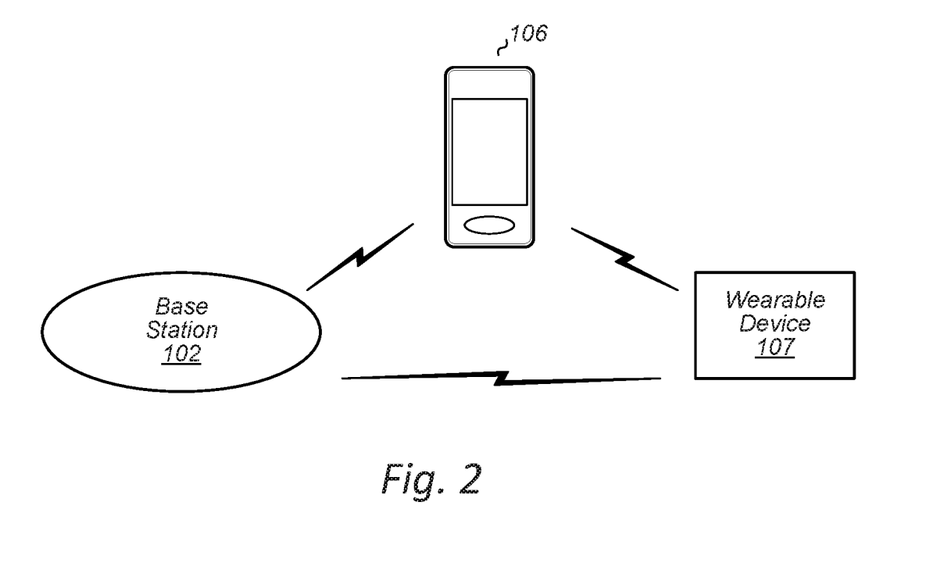
FIG. 2 illustrates an example system in which a wireless accessory device (AD) can selectively either directly communicate with a cellular base station or utilize the cellular capabilities of an intermediate or proxy device such as a smart phone, according to some embodiments.

FIG. 2—Example System with a Wireless Accessory Device

FIG. 2 illustrates an example small form factor device 107 in communication with base station 102. The small form factor device 107 may be a wireless AD such as a smart watch or smart glasses. The wireless AD 107 may have cellular communication capability and be capable of directly communicating with the base station 102 as shown. When the wireless AD 107 is configured to directly communicate with the base station, the wearable device may be said to be in "autonomous mode."

The wireless AD 107 may also be capable of communicating with another device (e.g., UE 106), referred to as a proxy device or intermediate device, using a short-range communications protocol, and may then use the cellular functionality of this proxy device for communicating cellular voice/data with the base station 102. In other words, the wireless AD 107 may provide voice/data packets intended for the base station 102 over the short-range link to the UE 106, and the UE 106 may use its cellular functionality to transmit (or relay) this voice/data to the base station on behalf of the wireless AD 107. Similarly, the voice/data packets transmitted by the base station and intended for the wireless AD 107 may be received by the cellular functionality of the UE 106 and then may be relayed over the short-range link to the wearable device. As noted above, the UE 106 may be a mobile phone, a tablet, or any other type of hand-held device, a media player, a computer, a laptop or virtually any type of wireless device. When the wireless AD 107 is configured to indirectly communicate with the base station using the cellular functionality of an intermediate or proxy device, the wireless AD 107 may be said to be in "relay mode."

Various embodiments herein are described with respect to the wireless AD 107 selectively using either its own cellular functionality (autonomous mode) to communicate with a base station, or using the cellular functionality of the UE 106 (relay mode) for communications, e.g., for LTE or VoLTE. However, embodiments described herein may also be used with other radio access technologies (RATs), such as to enable the wireless AD 107 to selectively using either its own Wi-Fi functionality (autonomous mode) to communicate with a Wi-Fi access point, or use the Wi-Fi functionality of the UE 106 (relay mode) for Wi-Fi communications.

The wireless AD 107 may include a processor that is configured to execute program instructions stored in memory. The wireless AD 107 may perform any of the method embodiments described herein by executing such stored instructions. Alternatively, or in addition, the wireless AD 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

The wireless AD 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE (or LTE-Advanced) or Bluetooth, and separate radios for communicating using each of LTE-Advanced and Bluetooth. Other configurations are also possible.

The small form factor device (e.g., wireless AD) 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the wireless AD 107 is a smart watch or other type of wearable device. When the UE 106 is capable of being used by the wireless AD 107 as a proxy, the UE 106 may be referred to as a companion device to the wireless AD 107.

Figure 3:
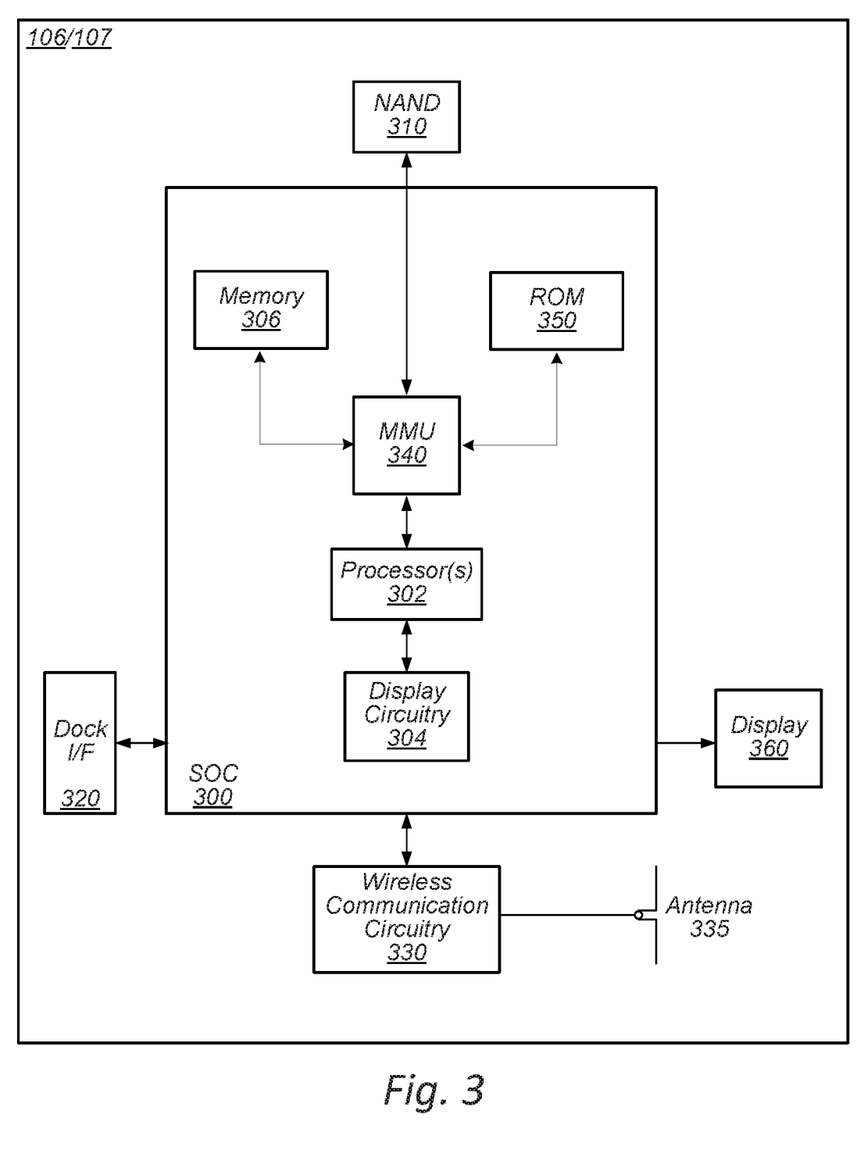
FIG. 3 is a block diagram illustrating an example UE, e.g., a smart phone or wearable device, according to some embodiments.

FIG. 3—Example Block Diagram of a UE Device

FIG. 3 illustrates one possible block diagram of a UE device 106 or a wireless AD 107. As shown, the UE 106/107 may include a system on chip (SOC) 300, which may include portions for various purposes. For example, as shown, the SOC 300 may include processor(s) 302 which may execute program instructions for the UE 106/107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310). The MMU 340 may be configured to perform memory protection and page table translation or setup. In some embodiments, the MMU 340 may be included as a portion of the processor(s) 302.

The UE device 106/107 may also include other circuits or devices, such as the display circuitry 304, radio 330, connector I/F 320, and/or display 360.

In the embodiment shown, ROM 350 may include a bootloader, which may be executed by the processor(s) 302 during bootup or initialization. As also shown, the SOC 300 may be coupled to various other circuits of the UE device 106/107. For example, the UE device 106/107 may include various types of memory, a connector interface 320 (e.g., for coupling to a computer system), the display 360, and wireless communication circuitry (e.g., for communication using LTE, 5G NR, CDMA2000, Bluetooth, WiFi, NFC, GPS, etc.).

The UE device 106/107 may include at least one antenna, and in some embodiments multiple antennas, for performing wireless communication with base stations and/or other devices. For example, the UE device 106/107 may use antenna 335 to perform the wireless communication. As noted above, the UE 106/107 may in some embodiments be configured to communicate wirelessly using a plurality of wireless communication standards or radio access technologies (RATs).

As described herein, the UE device 106 and/or the wireless AD 107 may include hardware and software components for implementing methods according to embodiments of this disclosure. The processor 302 of the UE device 106/107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
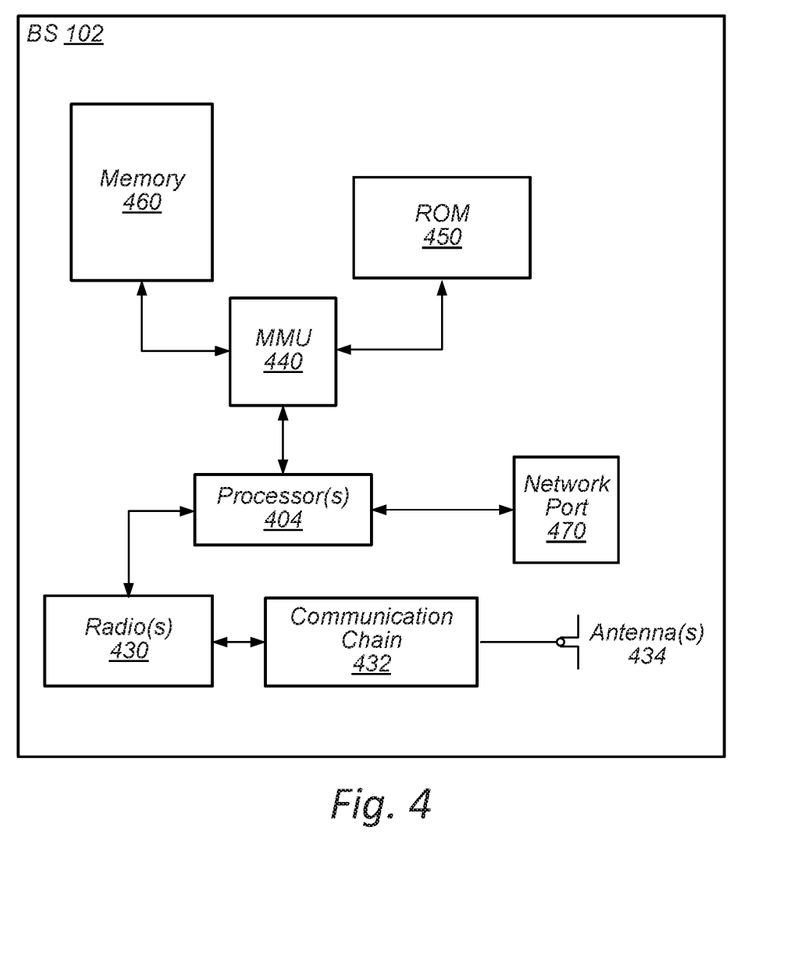
FIG. 4 illustrates an exemplary block diagram of a base station, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, 5G NR, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein.

Enhanced Text Messaging Mechanisms for an Accessory Device

Modern small form-factor wireless devices (such as wearable devices, accessory devices, smart watches and other types of wireless devices) may be equipped with both a short-range radio configured to pair and communicate with a companion device (e.g., a user equipment (UE) device such as a smart phone) as well as a cellular radio to independently communicate with a cellular base station. For example, modern accessory devices may be configured to independently connect to a base station to transmit and receive voice, text, and data with a network, even when it is not paired to a companion device. In some embodiments, the accessory device may have an independent phone number from its companion device, which it may use to communicate with the network when it is acting as an independent cellular device. Alternatively, when paired with the companion device, the accessory device may simply serve as a relay to communicate voice and data to a user, while the phone number of the companion device is used to communicate with the network.

As used herein, an accessory device (AD), such as the wireless AD 107 illustrated in FIGS. 1-3, is taken to refer to any of a variety of small form-factor devices, with or without an independent cellular radio and with or without an associated companion device such as a UE 106.

During typical use, an AD may dynamically change its connectivity to its companion device as well as its location relative to its companion device. Embodiments herein present enhancements for texting applications, such as short message service (SMS) applications or other texting applications, that are operating through or on an accessory device, to address complications that may arise in these environments.

Emergency Texting in Roaming Environment

In some embodiments, an AD and/or a UE may operate in a roaming environment, where texting applications may not function properly and/or where additional charges may be incurred for utilizing texting applications. For example, a typical short message service (SMS) message may be first sent to the home carrier's SMS Service Center (SMSC). However, if the device is roaming, the SMS may reach a different SMSC, possibly in a different country, which may lead to confusion and/or denial of service for the user, as well as introduce unnecessary load on the network. Additionally, in some embodiments, the AD and/or the UE may be configured with a "save our ship", or "SOS" feature wherein the user may present input to the device to indicate that the user is in distress. In these embodiments, activation of the SOS feature may cause the device to periodically transmit a text message to an emergency contact, such as an emergency agency (e.g., 911, 112 or the like) or to one or more custom emergency contacts configured on the device. However, if the device is in a roaming scenario, the emergency text may be unsuccessful or it may lead to unpredictable behavior. To address these and other concerns, various texting enhancements may be implemented as described below, according to various embodiments.

In some embodiments, the device may notify the user about the possibility of additional roaming charges for automatically generated SMS notifications to the emergency contacts when the SOS feature is used. In some embodiments, the device may prematurely fail the SMS when in a roaming environment, to inform the user ahead of time that the SOS service may not function properly in the roaming environment.

In other embodiments, upon activation, the SOS service may periodically send an emergency beacon to an emergency contact. In a roaming environment, this repeated transmission may incur a large expense on the user through roaming data and/or service usage fees. Accordingly, in these embodiments, the device may be configured to only send the emergency beacon once or another predetermined number of times (e.g., 3 or 5 times), to avoid additional fees from continually retransmitting the emergency beacon.

Multi-SIM Interruption Avoidance

In some embodiments, the AD may be a dual subscriber identity module (SIM) device configured with multiple SIMs such as a dual-SIM dual-standby (DSDS) device or another type of multi-SIM device. In these embodiments, the multi-SIM device may be engaged in an emergency texting session or another important texting session on a first SIM, and the device may receive an incoming call or text on a second SIM, potentially interrupting the ongoing texting session. For example, the incoming call or text may interrupt the ongoing texting session at either the baseband or the user interface (e.g., by presenting a popup notification). To avoid such interruptions, when the device initiates an emergency texting session or another important or high priority texting session, the device may automatically put the second SIM out of service (OOS) or into a low power mode wherein the second SIM no longer receives incoming calls.

Dynamic SIM Switching

In some embodiments, during an emergency texting session or another texting session, a particular outgoing text message may fail because of a fatal error at the baseband, a routing protocol error, and/or another reason. If the device is a multi-SIM device, the device may automatically reattempt to send the text message on another SIM, either with or without input from the user, according to various embodiments.

While reattempting to send the text message on another SIM may improve the likelihood of a successful transmission, it may adversely affect the continuity of the texting session. For example, if the dual-SIM device successfully sends one or more text messages to establish a texting session, switching SIMs mid-session may alter the number associated with the outgoing session and interrupt the continuity of the session. Particularly in an emergency texting session or another important or high priority texting session, it may be undesirable to switch the outgoing number (e.g., by switching SIMs) in the middle of the session. Accordingly, in these embodiments, the device may refrain from switching SIMs if a message fails to send after one or more messages have been successfully sent on a first SIM to establish the texting session, to preserve continuity of the session.

Preventing Pairing and/or Baseband Deactivation

In some embodiments, an AD may initiate an emergency texting session or another type of high-priority texting session through a network while operating in standalone mode (e.g., while it is not paired to a companion UE and is utilizing its own cellular radio for communicating with the network). In current implementations, if the AD moves into pairable proximity with its companion UE during the texting session, the AD may be configured to automatically power off its cellular baseband and pair with the companion UE in order to conserve battery power. This behavior may be undesirable as it may interrupt the ongoing texting session by switching numbers mid-session (e.g., from the phone number associated with the AD to the phone number associated with the companion UE), and may result in the AD missing one or more incoming text messages and/or failing to send one or more outgoing text messages associated with the ongoing texting session. Accordingly, in some embodiments the AD may be configured to start a countdown timer (e.g., 30 minutes, 1 hour, or another duration) upon initiation of an emergency or other texting session, wherein the AD will not pair with its companion UE or power down its cellular baseband if the companion UE becomes available until after the timer expires. In some embodiments, each transmitted and/or received text message associated with the texting session may cause the AD to reset the countdown timer.

Activating Cellular Data During Texting Session

In some embodiments, a texting session such as T-911, SOS, or another type of texting application active on a device may utilize Network-Initiated Location Queries (NILR) or another type or service that requires cellular data to be active on the device to function properly. For example, the location accuracy of a device may be greatly improved if the device has access to data, as the data channel may be able to facilitate access to the Hybridized Emergency Location (HELO) service or another data-based location service, in circumstances where it is important for the network to determine the location of the device in a short period of time. Additionally, a user of the device may have deactivated cellular data on the device to reduce data fees or for other reasons. In these embodiments, if the user attempts to initiate a high priority texting session or another type of texting session that requires cellular data, the device may be configured to automatically turn on cellular data to ensure that the session operates successfully. For example, it may important that an emergency texting service such as T-911 is able to utilize NILR to identify the location of the device, and the user of the device may not have time or be in a proper state of mind to reconfigure cellular data for the T-911 session. It may also be important that an SOS service also be able to utilize NILR to, for example, provide the location of the device to a user's emergency contacts. Accordingly, it may be desirable to automatically enable cellular data upon initiation of a T-911 session, to ensure that the emergency service providers are able to locate the device.

Alternatively, in some embodiments automatically activating cellular data may be user configurable from the user interface of the device, on a per-application and/or a per-SIM basis.

Figure 5:
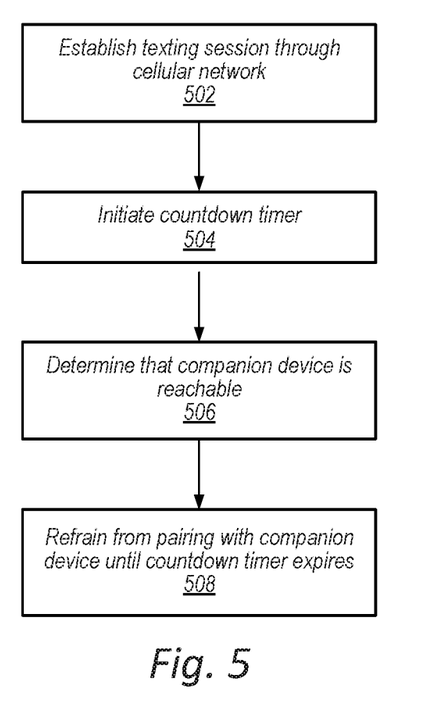
FIG. 5 is a flowchart diagram illustrating a method for utilizing a timer by a wireless AD to delay pairing with a companion device during a texting session, according to some embodiments.

FIG. 5—Flowchart for Texting Session Countdown Timer

FIG. 5 is a flowchart diagram illustrating a method for utilizing a countdown timer during a texting session by a wireless accessory device (AD), according to some embodiments. The scheme shown in FIG. 5 may be used in conjunction with any of the computer systems or devices shown in the above Figures, such as the wireless AD 107 illustrated in FIGS. 1-3, among other devices. In various embodiments, some of the elements of the scheme shown may be performed concurrently, in a different order than shown, or may be omitted. Additional elements may also be performed as desired. As shown, the scheme may operate as follows.

At 502, the wireless AD establishes a texting session with a network entity through the cellular network and using the cellular radio. For example, the wireless AD may act as a standalone cellular device to establish the texting session with the network entity, without relaying the texting session through a companion device such as a UE 106. The texting session may be any of variety of texting sessions, including an SOS session, an SMS session, or a high-priority texting session.

In some embodiments, the wireless AD may determine that the texting session is a high priority texting session. In these embodiments, if the wireless AD is a dual-SIM device that is operating the texting session through a first SIM, the wireless AD may put the second SIM out of service during the high priority texting session, to prevent an incoming call on the second SIM from interrupting the high priority texting session.

In some embodiments, the wireless AD may determine that the texting session requires access to cellular data to function properly. For example, as described in greater detail above, the texting session may involve the transmission of location information of the wireless AD through a data-driven service. In these embodiments, the wireless AD may automatically enable cellular data for the texting session at least in part in response to determining that the texting session requires access to cellular data to function properly.

At 504, the wireless AD initiates a countdown timer in response to establishing the texting session. The countdown timer duration may be selected based on a typical length of time utilized to complete the texting session, such as 30 minutes, an hour, or another duration.

At 506, the wireless AD determines that a companion device to the wireless AD is reachable by the wireless AD. For example, the wireless AD and/or the companion device may move into sufficient proximity of one another such that the wireless is able to connect to the companion device via BlueTooth™ or another short-range wireless communication technology that is used to establish a connection between the wireless AD and the companion device. The wireless AD may periodically monitor for a signal from the companion device, and may determine that the companion device is reachable based on a signal strength of the signal from the companion device exceeding a threshold. The companion device may be a UE 106 such as a smart phone or tablet that is associated with the wireless AD.

At 508, at least in part in response to determining that the companion device is reachable by the wireless device, the wireless AD refrains from pairing with the companion device until the countdown timer expires. For example, the wireless AD may be configured to automatically pair with the companion device when the companion device is reachable. However, if the countdown timer has not yet expired, the wireless AD may delay pairing with the companion device until after expiration of the countdown timer, to preserve continuity of the texting session. For example, the wireless AD may establish the texting session using a first phone number, while the companion device is configured to establish connections with the network using a second, different phone number. Accordingly, if the wireless AD pairs with the companion device during the texting session, the texting session may be interrupted if the wireless AD is unable to seamlessly migrate the texting session from the first phone number to the second phone number. Advantageously, the countdown timer may be utilized to grant the wireless AD sufficient time to complete the texting session before pairing with the companion device, to prevent an interruption to the texting session. Particularly if the texting session is a high priority texting session such as an SOS session or another high priority session, it may improve the user experience to prioritize continuity of the texting session over the benefits of pairing with the companion device (e.g., preserving battery life of the wireless AD and/or increasing the reliability of the network connection by using a larger and/or stronger radio of the companion device), by delaying the pairing process until the countdown timer expires. For example, in some embodiments, initiating the countdown timer and refraining from pairing with the companion device until the countdown timer expires is performed further in response to determining that the texting session is a high priority texting session.

In some embodiments, further in response to determining that the companion device is reachable by the wireless device, the wireless AD may refrain from powering down the cellular radio until the countdown timer expires.

In some embodiments, the wireless AD may receive an incoming text message and/or may send an outgoing text message through the texting session. In these embodiments, the wireless AD may restart the countdown timer in response to determining that either an incoming text message has been received or an outgoing text message has been sent through the texting session. In other words, the wireless AD may wait until no outgoing or incoming text messages have been sent or received, respectively, for the duration of the countdown timer before pairing with the companion device and/or powering down a cellular radio of the wireless AD.

In some embodiments, when the countdown timer expires, the wireless AD may pair with the companion device and/or power down the cellular radio of the wireless AD at least in part in response to determining that the countdown timer has expired and that the companion device is still reachable by the wireless AD.

In some embodiments, the wireless AD is a dual-SIM device configured with a first subscriber identity module (SIM) and a second SIM. In these embodiments, the wireless AD may determine that a first outgoing text message has failed to send through the texting session using the first SIM. In response to determining that the first outgoing text message has failed to send, the wireless AD may determine whether the first outgoing text message is the first attempted outgoing text message of the texting session, or whether the first outgoing text message failed to send after one or more other outgoing text messages have successfully been sent through the texting session using the first SIM. In these embodiments, if it is determined that the first outgoing text message is the first attempted outgoing text message of the texting session, the wireless AD may attempt to transmit the first outgoing text message using the second SIM based at least in part on determining that the first outgoing text message is the first attempted outgoing text message of the texting session. On the other hand, if it is determined that the first outgoing text message failed to send after one or more other outgoing text messages have successfully been sent through the texting session using the first SIM, the wireless AD may refrain from attempting to send the first outgoing text message using the second SIM based at least in part on determining that the first outgoing text message failed to send after one or more other outgoing text messages have successfully been sent through the texting session using the first SIM.

As described above, one aspect of the present technology is the gathering and use of data available from specific and legitimate sources to, for example, improve the reliability of location information associated with users for emergency text messaging or other text messaging applications. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to more accurately identify the location of the user in accordance with their preferences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide location data for texting applications. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless accessory device (AD), comprising:
a cellular radio;
a first subscriber identity module (SIM) and a second SIM; and
a processing element coupled to the radio, wherein the wireless AD is configured to communicate with a cellular network using the processing element and the radio, wherein the wireless AD is configured to:
    establish a texting session with a network entity through the cellular network and using the cellular radio;
    determine that a first outgoing text message has failed to send through the texting session using the first SIM;
    determine that the first outgoing text message failed to send after one or more second outgoing text messages have successfully been sent through the texting session using the first SIM; and
    refrain from attempting to send the first outgoing text message using the second SIM based at least in part on determining that the first outgoing text message failed to send after one or more second outgoing text messages have successfully been sent through the texting session using the first SIM.

2. The wireless AD of claim 1, wherein the wireless AD is further configured to:
    determine that the first outgoing text message is the first attempted outgoing text message of the texting session; and
    attempt to transmit the first outgoing text message using the second SIM based at least in part on determining that the first outgoing text message is the first attempted outgoing text message of the texting session.

3. The wireless AD of claim 1, wherein establishing the texting session comprises sending the one or more second outgoing text messages.

4. The wireless AD of claim 1,
wherein the texting session comprises a high-priority texting session.

5. The wireless AD of claim 4,
wherein the wireless AD is further configured to put the second SIM out-of-service (OOS) when initiating the high-priority texting session.

6. The wireless AD of claim 4,
wherein the wireless AD is further configured to put the second SIM in a low power mode when initiating the high-priority texting session.

7. The wireless AD of claim 1, wherein the wireless AD is further configured to:
    determine that the texting session requires access to cellular data to function properly; and
    automatically enable cellular data for the texting session at least in part in response to determining that the texting session requires access to cellular data to function properly.

8. A non-transitory computer-readable memory medium comprising program instructions that, when executed by a processor, cause a wireless accessory device (AD) to:
    establish a texting session with a network entity through a cellular network using a cellular radio and a first subscriber identity module (SIM) of the wireless AD;
    determine that a first outgoing text message has failed to send through the texting session using the first SIM;
    determine that the first outgoing text message is the first attempted outgoing text message of the texting session; and
    attempt to transmit the first outgoing text message using a second SIM of the wireless AD based at least in part on determining that the first outgoing text message is the first attempted outgoing text message of the texting session.

9. The non-transitory computer readable memory medium of claim 8, wherein the program instructions are further executable to cause the wireless AD to:
    determine that the first outgoing text message failed to send after one or more second outgoing text messages have successfully been sent through the texting session using the first SIM; and refrain from attempting to send the first outgoing text message using the second SIM based at least in part on determining that the first outgoing text message failed to send after one or more second outgoing text messages have successfully been sent through the texting session using the first SIM.

10. The non-transitory computer readable memory medium of claim 9, wherein establishing the texting session comprises sending the one or more second outgoing text messages.

11. The non-transitory computer readable memory medium of claim 8,
wherein the texting session comprises a high-priority texting session.

12. The non-transitory computer readable memory medium of claim 11,
wherein the wireless AD is further configured to put the second SIM out-of-service (OOS) when initiating the high-priority texting session.

13. The non-transitory computer readable memory medium of claim 11,
wherein the wireless AD is further configured to put the second SIM in a low power mode when initiating the high-priority texting session.

14. The non-transitory computer readable memory medium of claim 8, wherein the wireless AD is further configured to:
determine that the texting session requires access to cellular data to function properly; and
automatically enable cellular data for the texting session at least in part in response to determining that the texting session requires access to cellular data to function properly.

15. A method for operating a wireless accessory device (AD), the method comprising:
establishing a texting session with a network entity through the cellular network using a cellular radio and a first subscriber identity module (SIM);
determining that a first outgoing text message has failed to send through the texting session using the first SIM;
determining that the first outgoing text message failed to send after one or more second outgoing text messages have successfully been sent through the texting session using the first SIM; and
refraining from attempting to send the first outgoing text message using a second SIM based at least in part on determining that the first outgoing text message failed to send after one or more second outgoing text messages have successfully been sent through the texting session using the first SIM.

16. The method of claim 15, wherein establishing the texting session comprises sending the one or more second outgoing text messages.

17. The method of claim 15,
wherein the texting session comprises a high-priority texting session.

18. The method of claim 17, further comprising:
putting the second SIM out-of-service (OOS) during the high-priority texting session.

19. The method of claim 17, further comprising:
putting the second SIM in a low power mode during the high-priority texting session.

20. The method of claim 15, further comprising:
determining that the texting session requires access to cellular data to function properly; and
automatically enabling cellular data for the texting session at least in part in response to determining that the texting session requires access to cellular data to function properly.

* * * * *